(No Model.)
M. JOO.
BOTTLE STOPPER.
No. 300,320. Patented June 10, 1884.
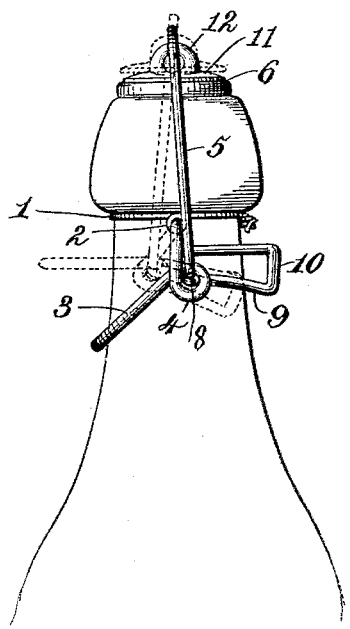
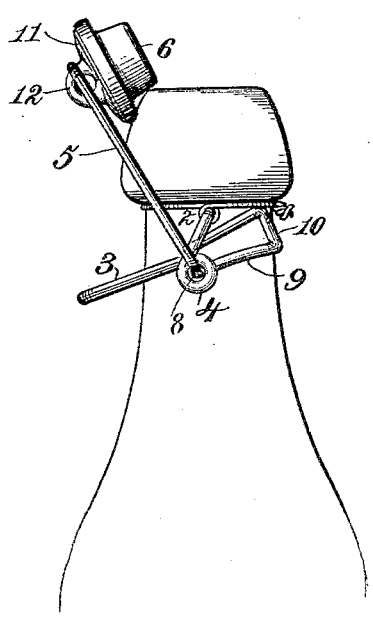
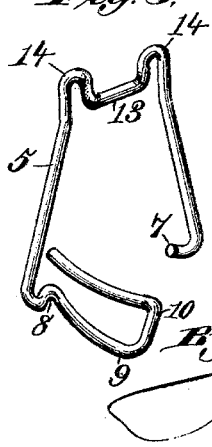
Witnesses.
Robert Everett.
Charles S. Ayer.
Inventor:
Morris Joo.
By James L. Norris.
Atty.

UNITED STATES PATENT OFFICE.

MORRIS JOO, OF ROANOKE, VIRGINIA, ASSIGNOR OF ONE-HALF TO MILLARD F. CHARLES, OF SAME PLACE.

BOTTLE-STOPPER.

SPECIFICATION forming part of Letters Patent No. 300,320, dated June 10, 1884.

Application filed April 28, 1884. (No model.)

*To all whom it may concern:*

Be it known that I, MORRIS JOO, a citizen of the United States, residing at Roanoke, Virginia, have invented new and useful Improvements in Bottle-Stoppers, of which the following is a specification.

This invention relates to improvements in that class of bottle-stoppers where a bail passes across the stopper and has its ends inserted in eyes provided in the arms of a yoke-shaped lever, the ends of which are inserted in eyes formed in a wire band encircling the neck of the bottle in such manner that when the lever is swung against the body of the bottle it acts on the bail to tightly press the stopper downward into the bottle-mouth, while to open the bottle the lever is swung away from the bottle, so that the bail is elevated and the stopper so loosened that it can be turned on its carrying-bail out of the bottle-mouth. This construction of bottle-stoppers is desirable from the fact that the stopping devices are never disconnected from the bottle, and from the further fact that the yoke-lever, acting on the bail which carries the stopper, enables the bottle to be most effectually stopped without danger of the stopper being accidentally displaced; but when the bottle is stopped it is inconvenient to remove the stopper, for the reason that, the lever depending and resting against or in close proximity to the bottle-body, it is difficult to obtain sufficient purchase on it with the fingers to swing the same away from the bottle-body, as is essential to elevate the stopper-carrying bail before the stopper can be so loosened as to permit it to be turned on the bail out of the bottle-mouth.

To avoid this objection and provide simple and efficient means whereby the yoke can be very conveniently and easily swung to release the stopper is the essential object of my invention, to which end it consists in the combination of devices hereinafter described and claimed.

In the accompanying drawings, Figure 1 is an elevation of part of a bottle, showing by full lines the stopping devices in their position when the bottle is stopped and in dotted lines their position when the stopper is loosened; Fig. 2, a similar view showing the position of the parts when the stopper is entirely out of the bottle-mouth, and Fig. 3 a detached perspective view of the stopper-carrying bail.

Referring to the drawings, the number 1 indicates a ring or band, preferably of wire, encircling the neck of the bottle directly under the shoulder of the bottle-mouth, and 2 an eye in the band at one side of the bottle-neck, there being a similar eye at the opposite side. (Not shown.) The lever 3 is formed as a yoke approximating the shape of the letter U, the arms being bent around to form in each an eye, 4, while the extremities of the arms are bent inward into the eyes 2, and constitute pivots, whereby the lever can be swung in the arc of a circle described from the center of the eyes 2. The eyes in the arms of the lever are below their pivotal attachment, and constitute means for attaching the bail 5, which carries the stopper 6, the bail having the extremity of one arm turned inward, as at 7, into one of the eyes in the lever, and the other arm bent and passed through the other eye of the lever and shouldered, as at 8, to constitute an abutment, such bail-arm being thence extended horizontally, or approximately so, to provide a lateral push piece or stud, 9, the outer end, 10, of which preferably projects slightly beyond the bottle-neck, to be in convenient reach of a person's thumb, so that when the bottle is stopped and the parts are in the position shown in Fig. 1 the push-piece can be pressed upon and the yoke-lever thereby swung away from the bottle-neck to the position shown in dotted lines, Fig. 1, whereby the bail is thrown to one side of the pivot-bearings of the lever and slightly lifted to loosen the stopper, after which the latter can be turned out of the bottle-mouth and rest on one edge thereof, as shown in Fig. 2. When the bottle is stopped and the parts in the position shown in full lines, Fig. 1, they are locked against accidental displacement by reason of the pivotal bearings of the bail being thrown to one side of a vertical line taken centrally through the pivot-bearings of the lever. The push piece or stud 9 is preferably curved to extend to some degree in a direction around the bottle-neck, so that it is not liable to be accidentally operated by coming in contact with some object. The stopper is preferably constructed of rubber fitted and held upon a metal core, 11, which is provided with a perforated lug, 12, through which passes the cross-bar of the bail, the cross-bar being bent inward or downward, as at 13, to increase the leverage on the stopper when forcing it into the bottle-mouth. The outward extensions 14, formed by the bend 13, also serve to prevent undue lateral shifting of the stopper, and therefore when the stopper is out and in the position shown in Fig. 2 it rests upon the edge of the bottle-mouth, while if the lever 3 be depressed when the parts are in the position shown in Fig. 2 the stopper will be slightly thrown back and be firmly held in place on the edge of the bottle-mouth, so that in filling the bottle the stopper will not shift about.

The stopper-connections with the bottle are preferably of round wire, and the push-piece is integral with the bail, as clearly shown in Fig. 3; but the construction may be modified without departing from my invention.

Having thus described my invention, what I claim is—

1. The combination of a stopper, a bail carrying the same, a support for encircling the bottle-neck, a swinging lever attached at its extremities to the said support and pivotally connected with the ends of the bail, and a push-piece projecting horizontally, or approximately so, from one of the bail-arms, for swinging the lever, substantially as described.

2. The combination of the yoke-lever pivoted at its extremities to a support on the bottle, and having eyes intermediate its ends, with the stopper-carrying bail having one arm pivoted to one of the lever-eyes and the other arm passed through the other lever-eye, and extended horizontally, or approximately so, therefrom, to provide a push-piece, substantially as described.

In testimony whereof I affix my signature in presence of two witnesses.

MORRIS JOO.

Witnesses:
   JOHN H. DUNSTAN,
   A. LERAVENSTADT.